United States Patent [19]

Kawano et al.

[11] Patent Number: 5,033,109
[45] Date of Patent: Jul. 16, 1991

[54] POCKET TRANSCEIVER

[75] Inventors: Minori Kawano; Hideyo Ono, both of Hyogo, Japan

[73] Assignee: Mitsubishi Denki Kabushiki Kaisha, Hyogo, Japan

[21] Appl. No.: 309,153

[22] Filed: Feb. 13, 1989

[30] Foreign Application Priority Data

Jul. 1, 1988 [JP] Japan .............................. 63-164666

[51] Int. Cl.⁵ .................................................. H04B 1/38
[52] U.S. Cl. ..................................... 455/90; 455/127; 455/343
[58] Field of Search ............... 455/89, 90, 99, 127, 455/343, 346

[56] References Cited

U.S. PATENT DOCUMENTS 4,636,741 1/1987 Mitzlaff ................................ 455/89
4,673,861 6/1987 Dubovsky et al. .................... 455/89
4,677,654 6/1987 Lagin ................................... 455/89
4,688,262 8/1987 Schaefer et al. ..................... 455/128

*Primary Examiner*—Curtis Kuntz

[57] ABSTRACT

A pocket transceiver can be, for example a portable wireless telephone apparatus small enough to be put into a pocket of a user. The apparatus operates at a low power level. The pocket transceiver as an independent unit only handles signals at a low power level and is suitable for communication over close range. The pocket transceiver can also be used as a telephone apparatus for communication over long range, such as a mobile transceiver in a vehicle, by being connected to an adapter, which includes a power amplifier and a power controller for selecting an output power level out of multiple levels in response to an instruction from a transmitting-receiving unit of the pocket transceiver.

18 Claims, 3 Drawing Sheets

POCKET TRANSCEIVER

BACKGROUND OF THE INVENTION

1. Field of the Invention

The present invention relates to a pocket transceiver, for example, a wireless telephone that is small enough to be put into a pocket and operating at a low power level. The transceiver can be connected to an adapter so that its output power is amplified and transmitted, through an external antenna.

2. Description of the Prior Art

FIG. 1 is a circuit diagram showing a prior art portable radio transceiver disclosed, for example, in U.S. Pat. No. 4,636,741. Referring to the figure, reference numeral 1 denotes a transmitting-receiving unit including a microprocessor, 2 denotes a keyboard, 3 denotes a display, 4 denotes a microphone, 5 denotes a speaker, 7 denotes a battery, and 31 denotes a power control, which is composed of a logarithmic amplifier 36, a detector 37, and a power control driver 38. Reference numeral 32 denotes a power amplifier including stages 39 and 40 connected in series. Reference numeral 33 denotes a transmitter filter, 34 denotes a receiver filter, 35 denotes an antenna, 36 denotes a circulator, 41 denotes a power-control switching circuit made up of an inverting gate, 48 denotes a data bus for the microprocessor, 8 denotes an interface between a transceiver 51 and a vehicular adapter 52, 10 denotes a vehicular battery of a vehicle, 9 denotes a battery charger for charging the battery 7, 11 denotes a regulator for generating a reference voltage $V_R$ to be supplied to a power control 12, 12 denotes the power control similar to the power control 31 in the transceiver 51, 13 denotes a power amplifier similar to the power amplifier 32 in the transceiver 51, and 15 denotes a filter similar to the transmitter filter 33 in the transceiver 51, and 17 denotes an external antenna.

The operation of the above structure is described below. When the vehicular adapter 52 is separated at the interface 8, the transceiver 51 operates on the battery 7, and the antenna 35. The transmitter output, in this case, is controlled and set to any of eight levels, from level 1 to level 8, by the microprocessor of the transmitting-receiving unit 1 controlling the power control driver 38, which, in turn, controls the gain of the power amplifier 32.

When the vehicular adapter 52 is connected at the interface 8, the battery 7 is charged by the battery charger 9 through contacts 44a, 44b.

The switching circuit 41 detects through contacts 42a, 42b that a connection is established at the interface 8 and thereupon requests the microprocessor to select another program. Further, the transmitter filter 33 is disconnected from the internal antenna 35 and connected to the power amplifier 13 through contacts 46a, 46b, and the receiver filter 34 is disconnected from the antenna 35 and connected to the external antenna 17 through contacts 47a, 47b. At this time, the output of the power amplifier 32 is set to a predetermined level by the microprocessor, and the power control 12 and the power amplifier 13 on the side of the vehicular adapter 52 generate a desired power level according to the aforesaid predetermined level and supply the power to the filter 15 and the external antenna 17. Since the data bus 48 for the microprocessor is connected to the power control 12 through contacts 45a, 45b, the power control 12 is enabled, in response to, for example, a predetermined message received from the microprocessor, to control the power amplifier 13 to output power in the range from level 1 to level 8.

With the prior art portable transceiver constructed as described above, the portable transceiver has had a large transmitter output, and hence it has required a large capacity of the battery 7. Thus, there has been a problem with the prior art because it is large in size and heavy in weight. In addition, the internal antenna has been of a λ/4 rod type or the like and hence its size has also been large.

SUMMARY OF THE INVENTION

The present invention was made to solve the above mentioned problems, and accordingly, it is an object of the present invention to provide a pocket transceiver smaller in size and lighter in weight which is portable and can be put into a pocket.

The pocket transceiver according to the present invention is provided with an internal power supply in its pocket transceiver for maintaining the transmitter output thereof at the specified lowest level and with amplifying and control means in its adapter for amplifying the transmitter output of the pocket transceiver to specified intermediate levels, or, the highest level.

Hence, the pocket transceiver according to the present invention requires no high power amplifying and control means within its transceiver body.

DETAILED DESCRIPTION OF THE PREFERRED EMBODIMENTS

Figure 1:
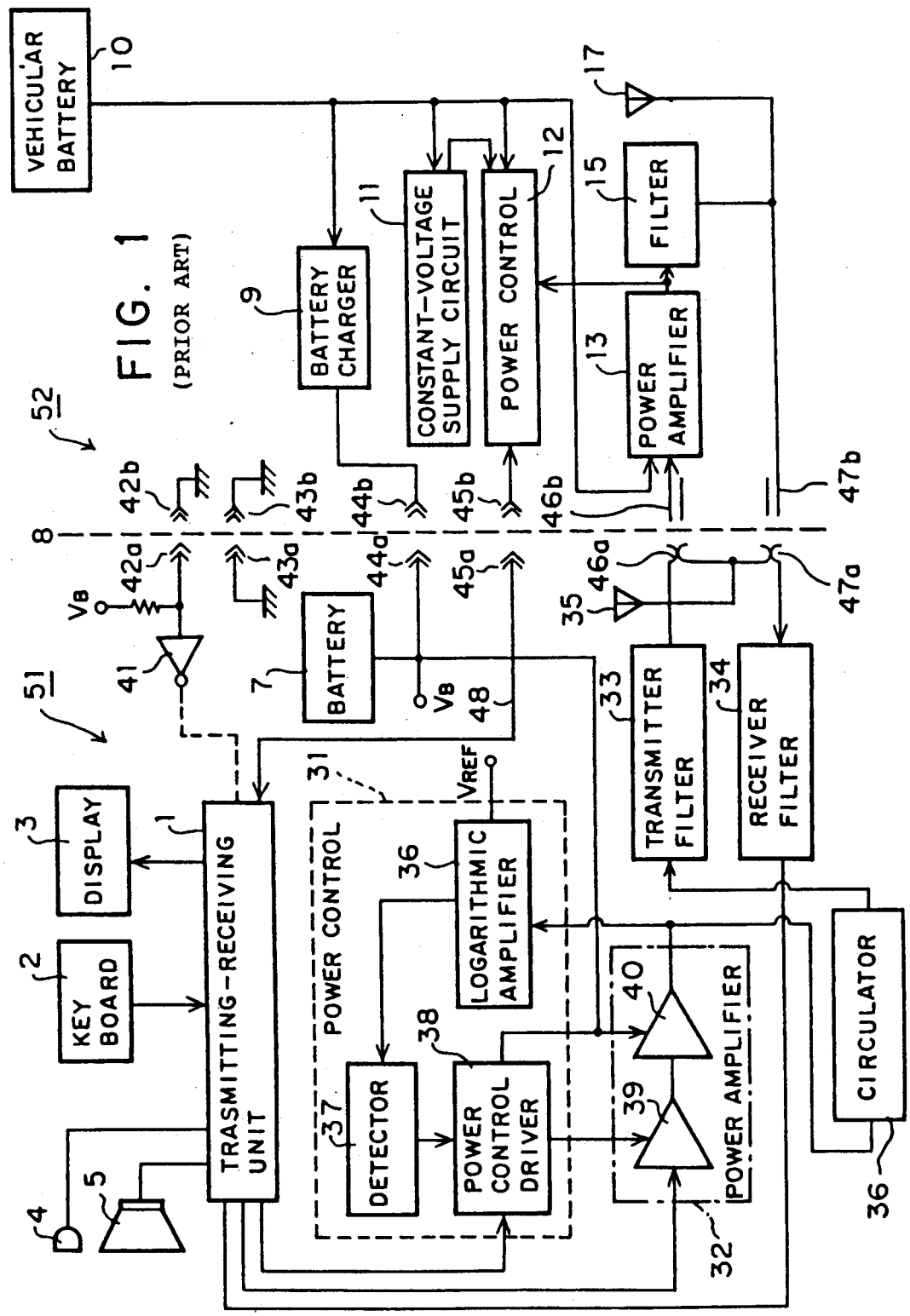
FIG. 1 is a circuit diagram showing a prior art portable transceiver.
Figure 2:
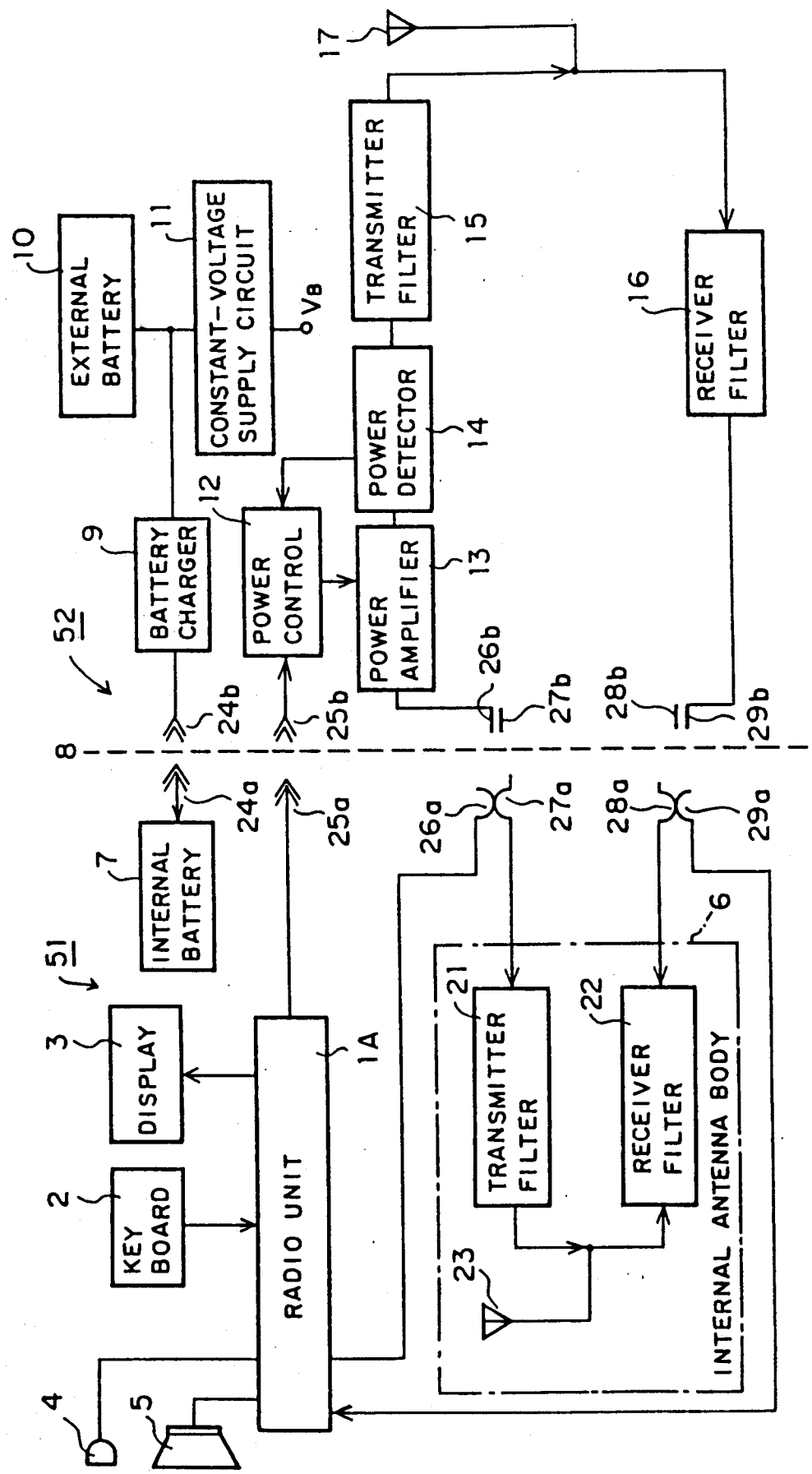
FIG. 2 is a circuit diagram showing a pocket transceiver according to an embodiment of the present invention.

An embodiment of the present invention will be described below with reference to the accompanying drawings. Referring to FIG. 2, 1A denotes a control, including a transmitting-receiving unit and a microprocessor of the pocket transceiver 51, (hereinafter to be called "radio unit"), 2 denotes a keyboard, 3 denotes a display, 4 denotes a microphone, 5 denotes speaker, 21 denotes a transmission filter, and 22 denotes a reception filter, the filters 21 and 22 constituting a duplexer. Reference numeral 23 denotes an internal antenna, and the internal antenna 23, the transmitter filter 21, and the receiver filter 22 put together are called an internal antenna body 6. Reference numeral 7 denotes an internal battery, 8 denotes an interface between the pocket transceiver 51 and the adapter 52, 10 denotes an external power supply provided by a vehicular battery of a vehicle, 9 denotes a charger as the charging means, 11 denotes a constant-voltage supply circuit, 12 denotes a power control as a control means, 13 denotes a power amplifier as an amplifying means, whose amplification factor is variably controlled by the power control 12, for amplifying a high-frequency signal, 14 denotes a power detector for detecting the output of the power amplifier 13, 15 denotes a transmitter filter, and 16 denotes a receiver filter. Reference numeral 25a and 25b denote control signal output terminals of the radio unit 1A, 24a and 24b denote terminals connecting the internal power supply 7 to the charger 9, 26a denotes a transmitter signal output terminal of the radio unit 1A, 29a denotes an receiver signal input terminal of the radio unit 1A, (hereinafter to be called "terminals"). The transmitter filter 15 and the receiver filter 16 constitute a duplexer.

The operation of the above is as follows. The transmitter output of the radio unit 1A is set to the specified lowest output level (6 mW, for example) and this output level is not subjected to control by the microprocessor. The microprocessor of the radio unit 1A, in response to a command received by the receiver of the radio unit 1A, outputs a message to control the output power of the power amplifier 13 through terminals 25a, 25b. Since the control line for this message is floated and independent of the state of connection at the interface 8, no damages on the circuits and/or malfunctions may occur even if there occurs an open circuits, a short circuit or the like.

On receipt of the message from the microprocessor, the power control 12 controls the output of the power amplifier 13 at one level, for example, any of eight levels from 1 to 8. The output of the power amplifier 13 is detected by the power detector 14 to be transformed into a D.C. voltage. This voltage is compared with reference voltages 1 to 8 established in the power control 12, and thereby, the output of the power amplifier 13 is controlled to be the same as the reference voltage. Here, level 1 is the lowest level, level 8 is the highest level, and levels 2 to 7 are the intermediate levels. The output of the power amplifier 13 is transmitted through the power detector 14 and the transmitter filter 15 from the external antenna 17.

The internal antenna body 6, when the connection at the interface 8 is established, is put into an open state with disconnection of the transmitter signal terminals 26a from 27a and the receiver signal terminals 28a from 29a respectively. Hence, the transmitter signal output terminal 26a of the radio unit 1A is connected to the power amplifier 13 and the receiver signal input terminal 29a of the same is connected to the external antenna 17 through the receiver filter 16.

The transmitter filter 21 and the receiver filter 22 in the internal antenna body 6 are operated with disconnection of the interface 8, and since the output level of the transmitter signal is low in this case, they need not be of high selectivity and of large size. Since the internal antenna 23 is provided in a compact form as a microhelical antenna, it has a narrow bandwidth and is not matched with 50Ω, so that the matching with 50Ω is provided at the connection terminals 27a and 28a of the respective filters 21 and 22.

The charger performs a quick charging operation when an ignition key (not shown) is turned ON and perform trickle charging when the ignition key is turned OFF. At the time of the trickle charging, the current is limited by means of a series resistor whereby the internal or the external battery is prevented from being damaged by short-circuiting or the like.

Although, in the above embodiment, the charger 9 was described to perform a quick charge when the ignition key is turned ON and performs trickle charging when the ignition key is turned OFF, it may so constructed to have only a quick charge performed when the ignition key is turned ON or to have trickle charge performed both when the ignition key is turned ON and when it is turned OFF.

Although, in the above embodiment, it was arranged such that the internal antenna body 6 is put into an open state with disconnection of the interface 8 and thereby the transmitter and receiver terminals 26a and 29a of the radio unit 1A are connected to the transmitter and receiver terminals 26b and 29b on the side of the adapter 52, the internal antenna 23 may be arranged to have been matched 50Ω and disconnecting the internal antenna 23 from the output terminal of the transceiver filter 21 and the receiver filter 22. These output terminals are connected through the transmitter and receiver terminals 26b and 29b to the power amplifier 13 and the receiver filter 16. Or, the internal antenna 23 may be arranged to couple electric-magnetically through a coupling means provided within the adapter 52, and the internal antenna 23 is connected through the coupling means to the power amplifier 13 and the receiver filter 16. Further, while the external power supply 10 was described to be a vehicular battery of a vehicle, it may be an A.C. power supply.

Figure 3:
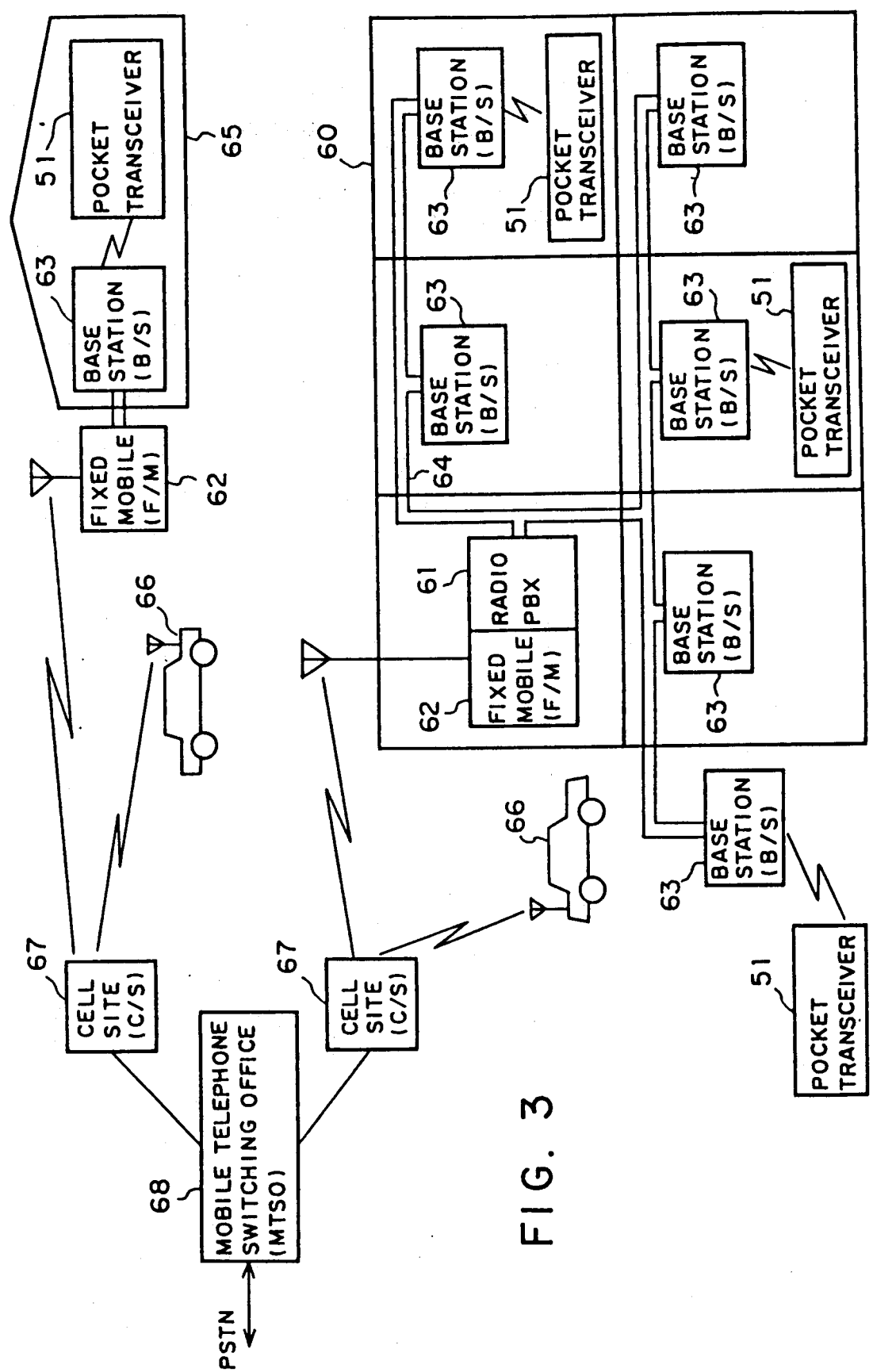
FIG. 3 is a system structure diagram showing an example of use of the pocket transceiver shown in FIG. 2.

FIG. 3 is a system structure drawing showing an example of a communication system structure using the pocket transceivers 51 according to the present invention. Referring to the diagram, 60 denotes an office, 61 denotes a Radio PBX installed in this office 60, 62 denotes a Fixed Mobile (F/M) constituting a part of the Radio PBX 61 and having a radio transmitter and receiver function, 63 denote Base Station (B/S) for the pocket transceiver 51 provided at suitable locations in the office 60 such as each of the rooms, and 64 denote local lines Further, 65 denotes for example, a house, wherein there are installed only the F/M 62 and the B/S 63.

On the other hand, 66 denotes a Mobile Subscriber (M/S) in which a pocket transceiver 51 is used as a mobile telephone in a motor vehicle. The M/S 66 makes radio communication with a Cell Site (C/S) 67 provided at each of suitable locations. The C/S's 67 are controlled by a Mobile Telephone Switching Office (MTSO) 68. The MTSO 68 calls up any of the M/S's 66 and accepts a request for a call from any of the M/S's 66. Besides making the connection between each M/S 66 through a C/S 67, the MTSO 68, connected to the exchanger of a PSTN, makes a connection between a subscriber to the PSTN and a M/S 66.

A method of using the pocket transceiver 51 in the aforesaid system is described as follows. The method of the use in the office 60 will first be described. For example, pocket transceivers 51 are distributed among workers in the office 60 and each worker carries the pocket transceiver 51 and uses it as a local area telephone. Each carrier of the pocket transceiver 51 is capable of communicating with another carrier through the B/S's 63, the local area line 64 and the Radio PBX 61. By having B/S's installed also outside the office, the pocket transceiver 51 can be used not only within the building of the office 60 but also outside the office 60, such as at a parking space. The carrier of the pocket transceiver 51 is further capable of talking with a M/S 66 outside the office 60 or a subscriber of the PSTN through the B/S 63, the local line 64, and the F/M 62 of the Radio PBX 61.

Domestic use is described as follows. A house, for example 65 is equipped with the F/M 62 and the B/S 63. An individual carrying a pocket transceiver 51 is capable of communicating with the C/S 67 through the B/S 63 and the F/M 62 and thereby talking with another subscriber.

In this operation, a pocket transceiver 51 is set to the specified lowest output level (6 mW, for example) and is served within a radius of a short distance (30-100 meters, for example) from a base stations 63 if the pocket transceiver 51 is within the office 60.

Further, when a worker in the office 60 goes out in a motor vehicle, the worker readily becomes a M/S 66 just by inserting his pocket transceiver 51 into the adapter 52 of the vehicle.

In this operation, a M/S 66 is allowed to transmit the radio transmitter signal of the one level out of the levels 1 through 8, and is served within a radius of a longer distance (1 km-20 km, for example) from a C/S 67 if the pocket transceiver 51 is attached to the adapter 52 of the vehicle.

What is claimed is:

1. A portable transceiver apparatus comprising:
   a transceiver body including means for transmitting and receiving communication signals, input means for supplying communication signals to be transmitted, output means for outputting received communication signals, and internal power supply means for supplying power to said means for transmitting and receiving, and said input and output means, said means for transmitting and receiving communication signals including a control portion outputting communication signals at a level fixed to a specified lowest output level out of a plurality of levels, a transmitter filter connected with the control portion directly by separable connection terminals, and a receiver filter connected with the control portion directly via other separable connection terminals; and
   an adapter to be detachably connected to said transceiver body, including amplifying means for amplifying signals to be transmitted from said control portion through said terminals which are detached from the transmitter and receiver filters when the adapter is connected to said portable transceiver body, control means responsive to a control signal from said control portion for setting the gain of said amplifying means to one level out of a plurality of levels, means for coupling signals from said amplifying means to an external antenna, and means for coupling signals from said external antenna to said means for transmitting and receiving.

2. A portable transceiver apparatus according to claim 1, wherein said means for transmitting and receiving includes, within said transceiver body, an internal antenna to be connected in circuit with said means for transmitting and receiving upon detachment of said adapter from said transceiver body.

3. A portable transceiver apparatus according to claim 2, wherein said means for coupling the signals to said external antenna includes a transmitter filter, said means for coupling the signals to said means for transmitting and receiving includes a receiver filter, and said transceiver body includes a transmitter filter and a receiver filter between said means for transmitting and receiving and said internal antenna.

4. A portable transceiver apparatus according to claim 3, wherein said transceiver body is further constituted of connection means for putting said transmitter filter and said receiver filter included thereof into either an open state and/or a closed state upon attachment of said adapter to said transceiver body.

5. A portable transceiver apparatus according to claim 4, wherein said connection means includes matching circuits for said antenna.

6. A portable transceiver apparatus according to claim 1, wherein said adapter further includes charging means for charging said internal power supply means when said adapter is attached to said transceiver body.

7. A portable transceiver apparatus according to claim 6, wherein said charging means is coupled with a power supply mounted on a motor vehicle.

8. A portable transceiver apparatus according to claim 1, wherein said input means is a microphone.

9. A portable transceiver apparatus according to claim 1, wherein said output means is a speaker.

10. A portable transceiver apparatus according to claim 1, wherein said control portion is a microprocessor.

11. The apparatus of claim 1, wherein said adapter and transceiver body are detachably connected to each other.

12. The apparatus of claim 1, wherein said specified lowest level is about 6 mW.

13. A communication method using a wireless telephone comprising the steps of:
   (a) providing a portable transceiver body including a transceiver for transmitting and receiving communication signals wherein an output level of the transmitting signal is always the lowest power level out of a plurality of power levels,
   (b) providing an adapter which is detachably attachable to said portable transceiver body, and includes an amplifier for amplifying the output power of transmitter signals from said portable transceiver body and an antenna for transmitting communication signals at a power level higher than said lowest power level,
   (c) attaching said adapter to said portable transceiver body for performing communication over long range, and
   (d) using said portable transceiver body as an independent unit without the adapter for performing communication over close range.

14. The method of claim 13, wherein said transceiver body includes a transmitter filter and a control portion directly connected to each other by detachable connection terminals.

15. The method of claim 14, wherein said transceiver body includes a receiver filter directly connected with the control portion by other detachable connection terminals.

16. The method of claim 13 wherein said output level is about 6 mW.

17. A communication method using a wireless apparatus which can send signals over short and long ranges comprising the steps of:
   (a) providing a portable transceiver body including a transceiver for transmitting and receiving wherein an output level of the transmitting signal is always the lowest power level out of a plurality of the transmitting signals, the body transceiver including a transmitter and receiver filter and a control portion directly connected to the transmitter and receiver filters by detachable connection terminals, the transceiver body further including means for detachably connecting to an adapter; and
   (b) using the portable transceiver body independently without the adapter for communicating over a short range.

18. The method of claim 17 further comprising the steps of:
   (c) attaching the adapter to the transceiver body; and
   (d) using the portable transceiver body for communicating over a long range.

* * * * *